United States Patent
Narita et al.

(10) Patent No.: US 8,161,086 B2
(45) Date of Patent: Apr. 17, 2012

(54) RECORDING DEVICE, RECORDING METHOD, COMPUTER PROGRAM, AND RECORDING MEDIUM

(75) Inventors: Tetsuya Narita, Tokyo (JP); Yoshiaki Shibata, Kanagawa (JP); Minoru Kawahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 12/174,809

(22) Filed: Jul. 17, 2008

(65) Prior Publication Data
US 2009/0024651 A1    Jan. 22, 2009

(30) Foreign Application Priority Data

Jul. 19, 2007   (JP) ................................. 2007-188563

(51) Int. Cl.
*G06F 12/00* (2006.01)
*G06F 17/30* (2006.01)
(52) U.S. Cl. .................... 707/827; 707/711; 709/247
(58) Field of Classification Search ........................... None
See application file for complete search history.

(56) References Cited

U.S. PATENT DOCUMENTS

| | | | | |
|---|---|---|---|---|
| 6,006,226 A * | 12/1999 | Cullen et al. | ................ | 382/232 |
| 2002/0083468 A1* | 6/2002 | Dudkiewicz | ................ | 725/133 |
| 2002/0138517 A1* | 9/2002 | Mory et al. | ................ | 707/513 |
| 2003/0163477 A1* | 8/2003 | Visharam et al. | ................ | 707/100 |
| 2003/0174906 A1* | 9/2003 | Sekiguchi et al. | ................ | 382/305 |
| 2004/0003013 A1* | 1/2004 | Coulthard et al. | ................ | 707/205 |
| 2004/0034610 A1* | 2/2004 | De Lacharriere et al. | ...... | 706/20 |
| 2004/0034655 A1* | 2/2004 | Tecu et al. | ................ | 707/104.1 |
| 2004/0098398 A1* | 5/2004 | Ahn et al. | ................ | 707/100 |
| 2004/0109501 A1* | 6/2004 | Wollborn | ................ | 375/240.08 |
| 2004/0167905 A1* | 8/2004 | Eakin | ................ | 707/100 |
| 2004/0190880 A1* | 9/2004 | Komoda et al. | ................ | 386/125 |
| 2004/0230558 A1* | 11/2004 | Tokunaka | ................ | 707/1 |
| 2004/0267698 A1* | 12/2004 | Shinkai et al. | ................ | 707/1 |
| 2004/0267710 A1* | 12/2004 | Cotarmanac'h et al. | ...... | 707/3 |
| 2004/0267819 A1* | 12/2004 | Shinkai et al. | ................ | 707/104.1 |
| 2005/0033760 A1* | 2/2005 | Fuller et al. | ................ | 707/100 |

(Continued)

FOREIGN PATENT DOCUMENTS

JP    2004 535034    11/2004

(Continued)

OTHER PUBLICATIONS

An Evaluation of existing metadata compression and encoding technologies for MPEG-21 application, Timmerer et al, Department of Information Technology (ITEC), Klagenfurt University, Oct. 2005.*

(Continued)

*Primary Examiner* — Pierre Vital
*Assistant Examiner* — Augustine Obisesan
(74) *Attorney, Agent, or Firm* — Frommer, Lawrence & Haug LLP; William S. Frommer

(57) ABSTRACT

There is provided a recording device for generating and coding metadata, the recording device including a metadata describing part for describing the metadata; and a coding part for coding the metadata described in the metadata describing part in a binary format, and generating coded data; wherein the metadata describing part describes alternative information for embedding alternative data to the coded data when data is not present for a non-essential item in the metadata; and the coding part performs coding with the alternative data embedded when the alternative information is described.

5 Claims, 8 Drawing Sheets

U.S. PATENT DOCUMENTS

| | | | |
|---|---|---|---|
| 2005/0149557 A1* | 7/2005 | Moriya et al. | 707/104.1 |
| 2005/0185844 A1* | 8/2005 | Ono et al. | 382/190 |
| 2005/0192987 A1* | 9/2005 | Marsh | 707/100 |
| 2005/0203927 A1* | 9/2005 | Sull et al. | 707/100 |
| 2005/0243083 A1* | 11/2005 | Frazelle et al. | 345/419 |
| 2006/0036640 A1* | 2/2006 | Tateno et al. | 707/102 |
| 2006/0112124 A1* | 5/2006 | Ando et al. | 707/101 |
| 2006/0294144 A1* | 12/2006 | Shin | 707/104.1 |
| 2007/0009231 A1* | 1/2007 | Shinkai et al. | 386/95 |
| 2007/0033531 A1* | 2/2007 | Marsh | 715/738 |
| 2007/0086664 A1* | 4/2007 | Kim et al. | 382/239 |
| 2007/0143664 A1* | 6/2007 | Fang et al. | 715/513 |

FOREIGN PATENT DOCUMENTS

| | | |
|---|---|---|
| JP | 2005 18704 | 1/2005 |
| JP | 2005 20328 | 1/2005 |
| WO | WO 2007 026258 | 3/2007 |

OTHER PUBLICATIONS

Metadata-Driven multimedia access, Van Beek et al, IEEE Signal Processing Magazine, Mar. 2003.*

Davis S. J. et al.: "Exchanging XML Multimedia Containers Using a Binary XML Protocol" Multimedia and Expo, 2005, ICME 2005. IEEE International Conference on Amsterdam, The Netherlands 06-06 Jul. 2005, Piscataway, NJ, USA,IEEE, Jul. 6, 2005, pp. 358-361, XP010843836 ISBN: 978-0-7803-9331-8.

Anonymous: "D3.2.1 Metadata in the Digital Cinema Workflow and its standard report vl" www.lpracine.org [Online] Jun. 30, 2005, XP002508757 Retrieved from the Internet: url:http://www.ipracine.org/documents/Del_3_2_1_metadata.pdf.> [retrieved on Dec. 16, 2008].

Niedermeier U et al: "An MPEG-7 tool for compression and streaming of XML data" Multimedia and Expo, 2002. ICME '02. Proceedings. 2002 IEEE International Conference on Lausanne, Switzerland Aug. 26-29 , 2002, Piscataway, NJ, USA,IEEE, US, vol. 1, Aug. 26, 2002, pp. 521-524, XP010604420 ISBN: 978-0-7803-7304-4.

Avaro O et al: "MPEG-7 Systems: Overview" IEEE Transactions on Circuits and Systems for Video Technology, IEEE Service Center, Piscataway, NJ, US, vol. 11, No. 6, Jun. 1, 2001, pp. 760-764, XP001059865 ISSN: 1051-8215.

* cited by examiner

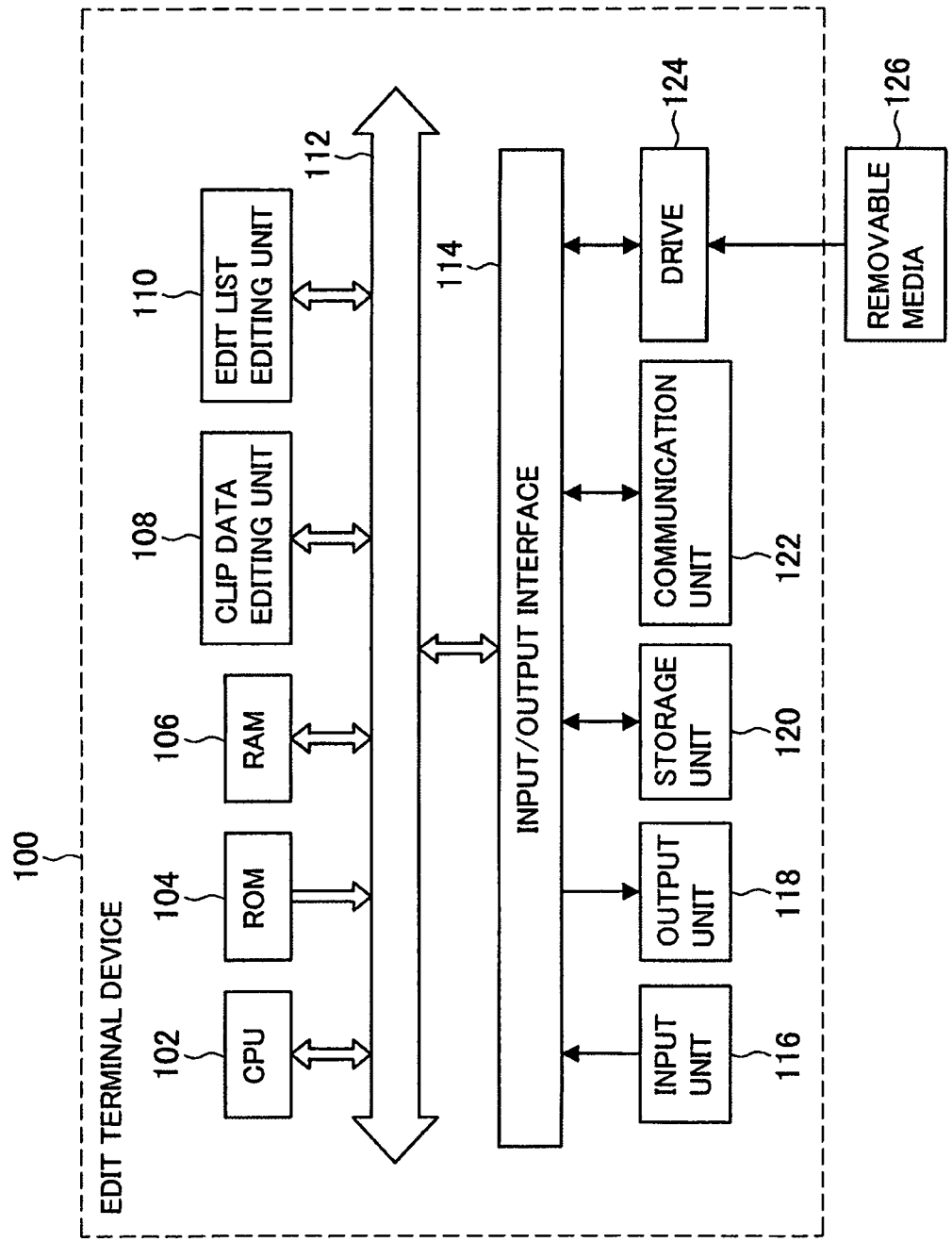

DEFINITION OF ALTERNATIVE DATA

XML schema
```
<choice>
  <element name="A"/>
  <element name="ANil"/>
</choice>
```

XML data
```
<ANil/>
```

```
<sequence>
  <choice>
    <element name="A"/>
    <element name="ANil"/>
  </choice>
  <choice>
    <element name="B"/>
    <element name="BNil"/>
  </choice>
  <choice>
    <element name="C"/>
    <element name="CNil"/>
  </choice>
       ⋮
  <choice>
    <element name="Z"/>
    <element name="ZNil"/>
  </choice>
</sequence>
```

XML schema
```
<sequence>
  <element name="A"minOccurs="0"/>
  <element name="B"minOccurs="0"/>
  <element name="C"minOccurs="0"/>
      ⋮
  <element name="Z"minOccurs="0"/>
</sequence>
```

XML data
```
<A>a</A>
<B>b</B>
   ⋮
<Z>z</Z>
``` data (BiM)

DATA PART element PRESENCE/ABSENCE IDENTIFIER (1bit)

RECORDING DEVICE, RECORDING METHOD, COMPUTER PROGRAM, AND RECORDING MEDIUM

CROSS-REFERENCE TO RELATED APPLICATION

The present invention contains subject matter related to Japanese Patent Application JP 2007-188563 filed in the Japan Patent Office on Jul. 19, 2007, the entire contents of which being incorporated herein by reference.

BACKGROUND OF THE INVENTION

1. Field of the Invention

The present invention relates to recording devices, recording methods, computer programs, and recording media, more specifically, a recording device for performing coding of metadata, a recording method, a computer program, and a recording medium.

2. Description of the Related Art

In recent years, use of metadata described with information related to data (hereinafter, also described as raw material data) of photographed picture raw material has been advancing in the field of film production. Here, metadata is used to search for the raw material data or to edit the raw material data.

The compatibility of metadata is desirable to effectively utilize the metadata. For instance, the metadata is desirably handled among a plurality of equipments used to produce a film in order to enable a video signal reproducing device such as an editing equipment to use the metadata generated by a video signal recording device such as video camera.

Standardization of the notation format of the metadata is being carried out to give consistency to the notation format and the meaning of the metadata. In MPEG (Moving Picture Experts Group) 7, the metadata is described using XML (eXtensible Markup Language) having high versatility to standardize the notification format of the metadata.

The metadata defined by MPEG 7 is classified to real time metadata where real time response with the raw material data is requested such as a time code indicating an absolute reproduction position of the raw material data, and non-real time metadata where real time response with the raw material data is not requested such as information indicating a place where the raw material data was photographed.

The real time metadata is often read out and used in parallel to the reproduction of the raw material data, and thus a method of compression coding the real time metadata described using the XML through a binary method, and recording the obtained coded data (hereinafter, also described as BiM (Binary format for MPEG-7 data)) in an aim of reducing time and resource for reading out the real time metadata is proposed (see e.g., Japanese Patent Application Laid-Open No. 2005-20328).

In the XML, camera operation parameters in photographing is generally recorded for still images, but the camera operation parameters corresponding to each frame of a moving image is not recorded.

The missing of item can be indicated by not recording the relevant item on the XML. However, a file having a complex data structure is generated if recorded with the BiM format, and a complex process is requested to comprehend the data. For instance, if a certain item is missing in the BiM format, the following items are arranged shifted towards the front, and thus a process of recording the index information indicating which data corresponds to which item is desirable, and the process becomes complicating.

SUMMARY OF THE INVENTION

If a certain item is missing in the BiM format, an offset in the data for one frame of each item does not become constant, and thus a process of analyzing the data structure in the frame and identifying the position of the item is desirable to acquire the data of a certain item.

The coded data is merely decoded to interpret the BiM data. However, the processing time becomes shorter and a decoder (BiM parser) for decoding the BiM data becomes unnecessary if the data is directly acquired from the coded data since the BiM data is not decoded.

In view of the above issues, it is desirable to provide a new and improved recording device, a recording method, a computer program, and a recording medium capable of easily performing recording and reading of data of binary format even if an item is missing in a non-essential item when describing the metadata.

According to an embodiment of the present invention, there is provided a recording device for generating and coding metadata, the recording device including a metadata describing part for describing the metadata; and a coding part for coding the metadata described in the metadata describing part in a binary format, and generating coded data; wherein the metadata describing part describes alternative information for embedding alternative data to the coded data when data is not present for a non-essential item in the metadata; and the coding part performs coding with the alternative data embedded when the alternative information is described.

According to such configuration, the metadata describing part describes the metadata. When describing the metadata, alternative information for embedding alternative data to the coded data is described when data is not present for a non-essential item in the metadata. The coding part codes the metadata described in the metadata describing part in a binary format, and generates the coded data. In coding, the coding part performs coding with the alternative data embedded when the alternative information is described. Thus, when describing the metadata, coding is performed with the alternative data embedded for the non-essential item even if an item is missing in the non-essential item, and thus recording and reading of data of the binary format can be efficiently carried out.

The metadata describing part may describe the alternative information with an element name having a predetermined letter string added to an element name of the non-essential item in the metadata. As a result, the coding part can perform coding with the alternative data embedded when the alternative information is described with an element name added with a predetermined letter string in the metadata described in the metadata describing part.

The coding part may perform coding with 1 added before the alternative data and 0 added before data other than the alternative data, when generating the coded data. As a result, the data is not present in a byte if the bit of the head of the byte is 1 and the data is present in the relevant byte if the bit of the head of the byte is 0, and thus the mask process is not performed when acquiring data, and acquisition of data from the coded data is facilitated.

According to another embodiment of the present invention, there is provided a recording method for generating and coding metadata, the recording method including the steps of: describing the metadata; and coding the metadata described in the metadata describing step in a binary format, and generating coded data; wherein in the metadata generating step, alternative information for embedding alternative data to the coded data is described when data is not present for a non-essential item in the metadata; and in the coding step, coding is performed with the alternative data embedded when the alternative information is described.

According to such configuration, the metadata describing step describes the metadata. When describing the metadata, alternative information for embedding alternative data to the coded data is described when data is not present for a non-essential item in the metadata. In the coding step, the metadata described in the metadata describing part is coded in a binary format, and the coded data is generated. In coding, coding is performed with the alternative data embedded when the alternative information is described. Thus, when describing the metadata, coding is performed with the alternative data embedded for the non-essential item even if an item is missing in the non-essential item, and thus recording and reading of data of the binary format can be efficiently carried out.

According to another embodiment of the present invention, there is provided a computer program for generating and coding metadata, the computer program including the steps of: describing the metadata; and coding the metadata described in the metadata describing step in a binary format, and generating coded data; wherein in the metadata generating step, alternative information for embedding alternative data to the coded data is described when data is not present for a non-essential item in the metadata; and in the coding step, coding is performed with the alternative data embedded when the alternative information is described.

According to such configuration, the metadata describing step describes the metadata. When describing the metadata, alternative information for embedding alternative data to the coded data is described when data is not present for a non-essential item in the metadata. In the coding step, the metadata described in the metadata describing part is coded in a binary format, and the coded data is generated. In coding, coding is performed with the alternative data embedded when the alternative information is described. Thus, when describing the metadata, coding is performed with the alternative data embedded for the non-essential item even if an item is missing in the non-essential item, and thus recording and reading of data of the binary format can be efficiently carried out.

According to another embodiment of the present invention, there is provided a recording medium recorded with the computer readable computer program.

According to another embodiment of the present invention, there is provided a recording method for recording data in a recording medium, the method including the steps of: temporarily storing data to be recorded in the recording medium before recording the data in the recording medium; detecting a continuous or fragmented free space of minimum allocation unit of the recording medium; performing a control to sequentially move and record the data stored in the data storing step to the continuous free space of the recording medium in normal recording, and move and record the data stored in the data storing step to the free space so as to fit within the fragmented free space of the recording medium detected in the detecting step for only the recording end portion; and recording the data on the recording medium according to the control of the recordation controlling step.

As described above, according to the present invention, a new and improved recording device, recording method, computer program, and recording medium capable of easily recording and reading data of binary format even if an item is missing in the non-essential item when describing the metadata are provided.

BRIEF DESCRIPTION OF THE DRAWINGS

FIG. 1 is an explanatory diagram describing a recording device 100 according to one embodiment of the present invention;

FIG. 2A is an explanatory diagram describing XML schema and XML data according to one embodiment of the present invention;

FIG. 2B is an explanatory diagram describing XML schema and XML data according to one embodiment of the present invention;

DETAILED DESCRIPTION OF THE PREFERRED EMBODIMENTS

Figure 3:
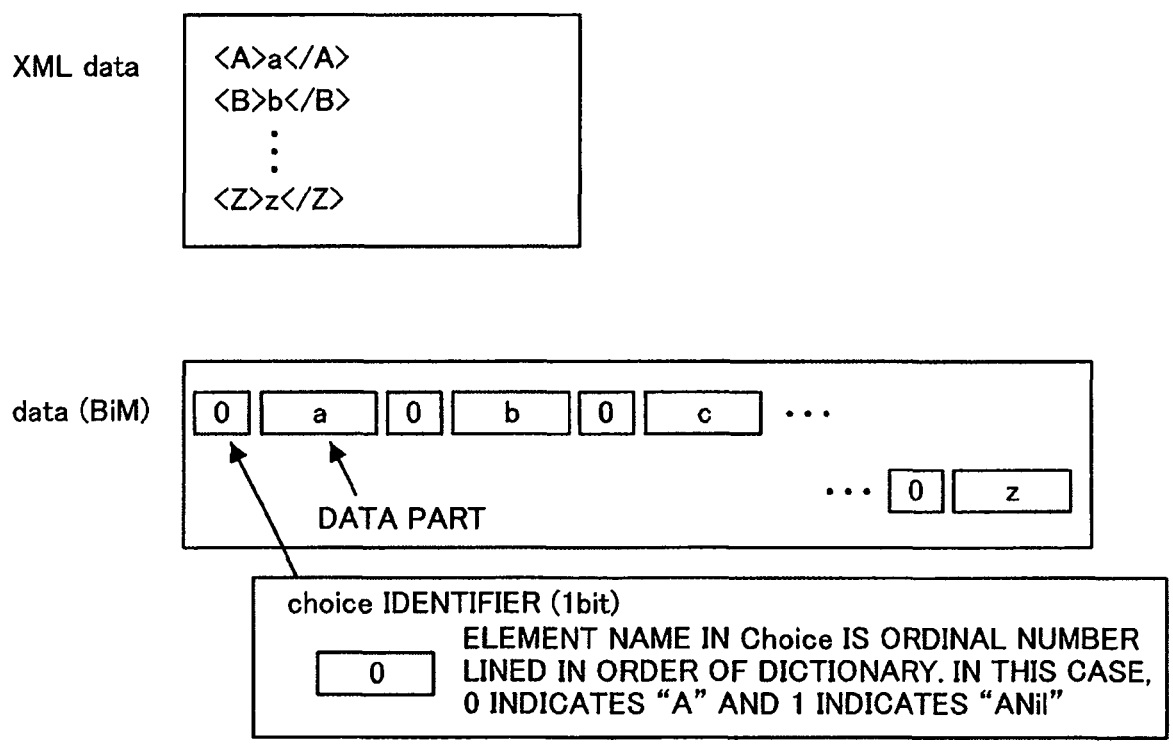
FIG. 3 is an explanatory diagram describing XML data and BiM data according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is an explanatory diagram describing a recording device 100 according to one embodiment of the present invention. The recording device 100 according to one embodiment of the present invention will be described below using FIG. 1.

The recording device 100 is a device used to edit picture data and audio data. The picture data and the audio data are input to the recording device 100 through a network or through a recording medium. The recording device 100 performs various editing processes on the input picture data and the audio data.

As shown in FIG. 1, the recording device 100 according to one embodiment of the present invention is configured to include a CPU (Central Processing Unit) 102, a ROM (Read Only Memory) 104, a RAM (Random Access Memory) 106, a clip data editing unit 108, an edit list editing unit 110, an input unit 116, an output unit 118, a storage unit 120, a communication unit 122, a drive 124, a bus 112, and an input/output interface 114.

The CPU 102 executes various processes according to a program stored in the ROM (Read Only Memory) 104. The data, the program, and the like for the CPU 102 to execute the various processes are appropriately stored in the RAM 106.

The clip data editing unit 108 performs the editing process on the image data, audio data, low resolution data, metadata or the like recorded on a removable media 126 loaded in the drive 124, or the low resolution data or the like acquired via the communication unit 122 based on the operation input from the user accepted by the input unit 116. The information about the edited content, information about the data after editing, and the like are generated by the editing process, and the generated information and the like are provided to the edit list editing unit 110. The clip data editing unit 108 performs a nondestructive editing process without updating the various data to be edited.

A metadata describing part of the present invention, and a BiM encoder, which is one example of a coding part, are incorporated in the clip data editing unit 108. The BiM encoder has a schema defining document (e.g., XML schema) defining the method of describing the metadata serving as the basis of the BiM.

The clip data editing unit 108 may include a BiM decoder for decoding the BiM data. The data encoded by the BiM encoder can be completely interpreted by the BiM decoder if the BiM encoder and the BiM decoder have a common schema defining document.

The edit list editing unit 110 generates an edit list which is information about the edit result based on various information generated with the editing process performed in the clip data editing unit 108, and stores the edit list in the storage unit 120. Here, the edit list editing unit 110 generates edit list clip metadata, which is clip metadata for edit list, based on the clip metadata which is the metadata in which real time property is not requested of the clip to be edited.

For instance, the edit list editing unit 110 generates a conversion table of non-continuous points of an LTC (Linear Time Code) corresponding to the image data and the like of the clip after editing, and a frame number thereof based on a conversion table included in the clip metadata of the clip to be edited, and records the conversion table as the edit list clip metadata.

The CPU 102, the ROM 104, the RAM 106, the clip data editing unit 108, and the edit list editing unit 110 are mutually connected by way of a bus 112. The input/output interface 114 is also connected to the bus 112.

The input/output interface 114 is connected with the input unit 116 configured by a keyboard and a mouse, and outputs the signal input to the input unit 116 to the CPU 102. The output unit 118 configured by a display, a speaker, or the like is also connected to the input/output interface 114.

Furthermore, the storage unit 120 configured by a hard disc, an EEPROM (Electronically Erasable and Programmable Read Only Memory), or the like, and the communication unit 122 for communicating data with another device through a network and the like are also connected to the input/output interface 114. The drive 124 is used to read data or write data with respect to the removable media 126 including a recording medium such as magnetic disc, optical disc, magnetic-optical disc, semiconductor memory, or the like.

The recording device 100 according to one embodiment of the present invention has been described above. The metadata recorded by the recording device 100 according to one embodiment of the present invention will be described below, but the metadata recorded in the related art will be described first before describing the metadata recorded by the recording device 100 according to one embodiment of the present invention.

Figure 6:
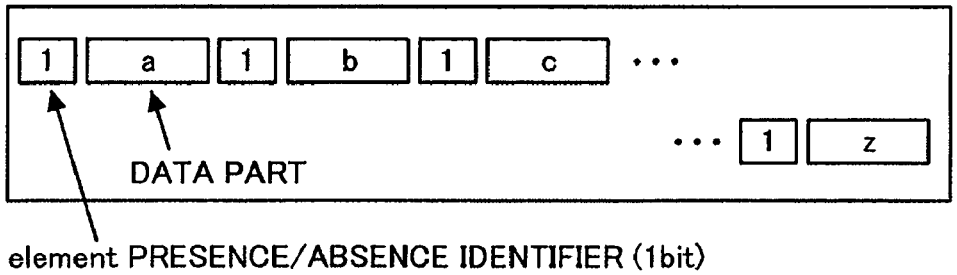
FIG. 6 is an explanatory diagram showing one example of metadata recorded in the related art.

FIG. 6 is an explanatory diagram showing one example of the XML schema serving as a basis for creating the metadata, the XML data created based on the XML schema data, and the (BiM data) obtained by coding the XML data with the BiM encoder in the metadata recorded in the related art.

The <sequence> tag is used to define so that elements appear in order in the XML schema. The element enclosed by <sequence> and </sequence> and defined with <element> appears in order on the XML data. Here, "minOccurs" in <element> is an attribute defining the minimum number of appearance, where 0 indicates that the relevant element can be omitted.

In the actual XML schema, a prefix indicating the being of XML schema which is "xsd" is added to each tag, but the description of "xsd:" is omitted in each tag of the XML schema in the following description and drawings.

In the example of the XML schema shown in FIG. 6, the elements "A", "B", "C", . . . , "Z" are defined to appear in order on the XML data. The data between the tags <A>, <B>, <C>, . . . , <Z> appear in order on the XML data defined and generated in the XML schema.

The BiM data obtained by compression coding the XML data shown in FIG. 6 with the BiM encoder is described with repetition of one bit of Element presence/absence identifier and a data part following the Element presence/absence identifier. The Element presence/absence identifier stores value 1 if the value is not omitted in the relevant element and 0 if omitted. In the example shown in FIG. 6, following the Element presence/absence identifier for element "A", the data coding the value a of the element "A" is stored in the data part, and thereafter, the Element presence/absence identifier and the data coding the value of the respective element are stored in order for the element "B", element "C", . . . , element "Z".

An element (non-essential element) that may not be essential in creating the data with the XML sometimes exists. In this case, "minOccurs=0" is defined for each element in the XML schema so that each element can be omitted.

Figure 7:
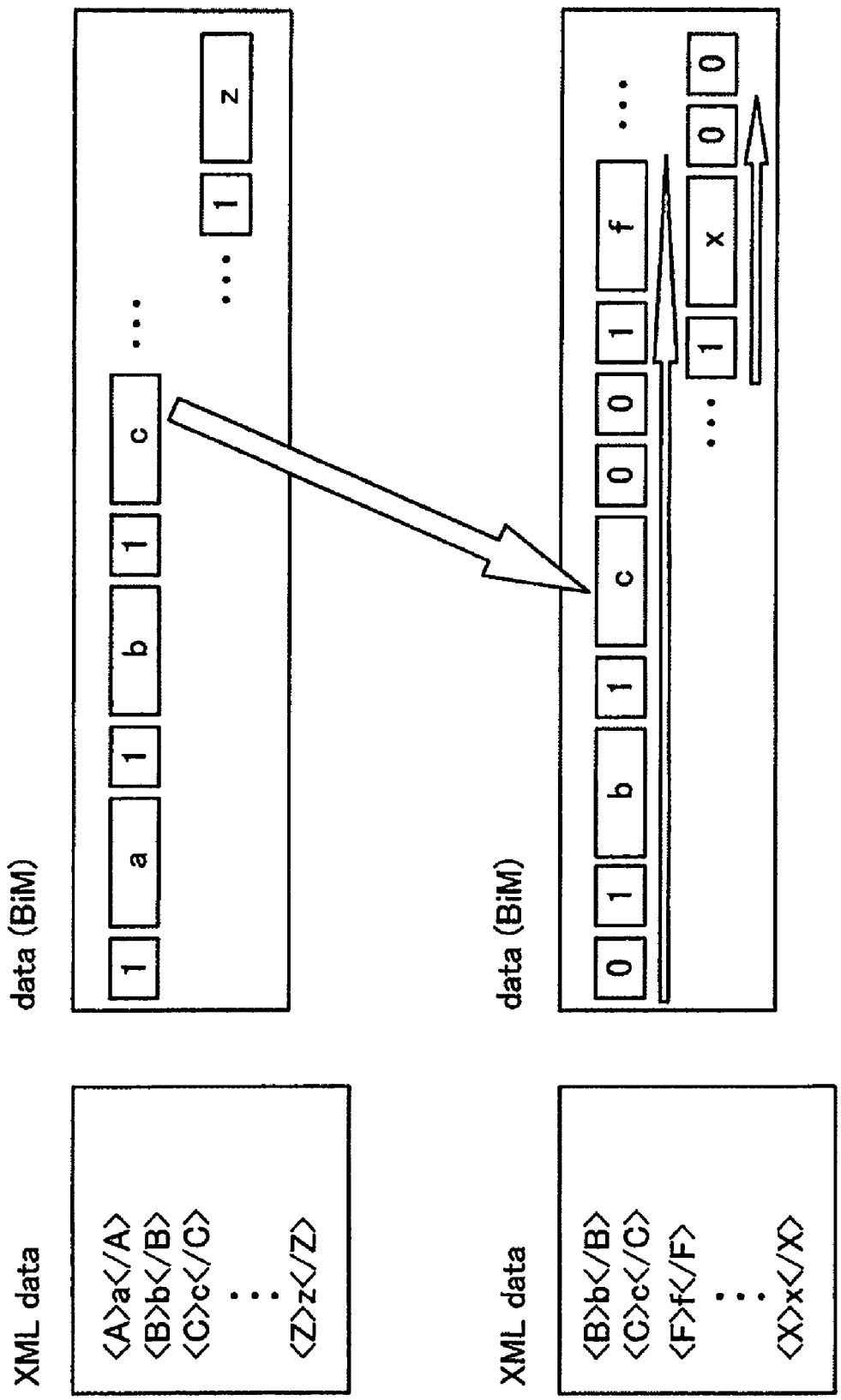
FIG. 7 is an explanatory diagram describing a difference in BiM data of when an element is not omitted and when the element is omitted.

If the omitted element of the non-essential elements is compression coded with the BiM encoder to become the BiM data, the data without the data part is obtained. FIG. 7 is an explanatory diagram describing the difference in the BiM data of when the element is not omitted and when the element is omitted.

The upper stage of FIG. 7 shows a case where none of the data is omitted, and the lower stage of FIG. 7 shows a case where one part of the data is omitted. If none of the data is omitted, all the Element presence/absence identifiers are 1, and the coded data coding the data of the respective element exists following the Element presence/absence identifier. If the data is omitted, the Element presence/absence identifier of the omitted element is 0, and the next data is the Element presence/absence identifier of the next element. That is, data without the data part of the omitted element is obtained. The offset of each data is thus not fixed.

In the example shown in FIG. 7, since the data of the element "A" is omitted, the Element presence/absence identifier is 0 and the data part of the element "A" does not exist, the Element presence/absence identifier and the data part of the element "B" exist, and the Element presence/absence identifier and the data part of the element "C" exist. Therefore, if the data of the element "A" is omitted, the position of the data parts of the element "B" and the element "C" are shifted forward compared to when the element "A" is not omitted.

In other words, when directly acquiring the data of a certain element from the BiM data in a coded state without decoding the BiM data with the BiM decoder, the data may not be specified with the position on the BiM. Therefore, the BiM data is sequentially searched from the head when directly acquiring the data of a certain element from the BiM data.

Thus, the process in acquiring the data of a target element from the BiM data becomes complex and the processing efficiency tends to lower when directly acquiring the data of a certain element from the BiM data in the related art.

Figure 8:
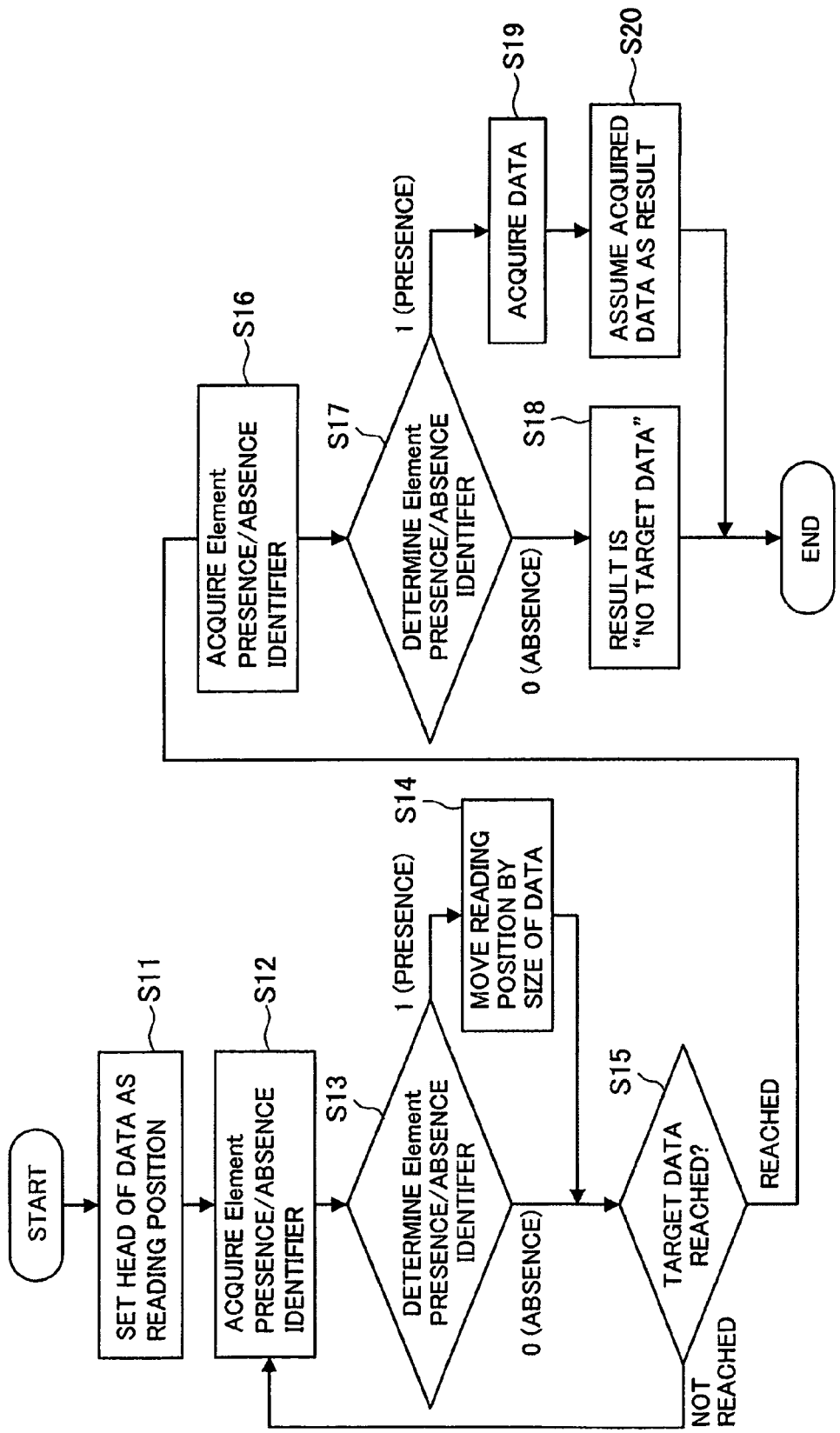
FIG. 8 is a flowchart of when directly acquiring the data of a target element from the BiM data generated in the related art.

FIG. 8 is a flowchart of when directly acquiring the data of a target element from the BiM data generated in the related art. First, the head of the BiM data is set at a reading position (step S11). The Element presence/absence identifier at the relevant reading position is acquired (step S12). Subsequently, the content of the Element presence/absence identifier acquired in step S12 is determined (step S13). If the Element presence/absence identifier is 1 in the determination of step S13, the data part corresponding to the relevant element exists and thus the reading position is moved by the size of the data part (step S14). If the Element presence/absence identifier is 0 in the determination of step S13, the reading position is not moved.

Whether or not the data of the target element is reached is then determined (step S15). If the data of the target element is not reached, the process returns to step S12 to acquire the Element presence/absence identifier, and the above process is repeated until reaching the data of the target element. The Element presence/absence identifier is acquired when reaching the data of the target element (step S16).

After acquiring the Element presence/absence identifier of the target data, the value of the acquired Element presence/absence identifier is determined (step S17). If the value is 0 in the determination of step S17, the result of no target data is obtained (step S18). If the value is 1 in the determination of step S17, the data is acquired from the data part (step S19), and the result of the acquired data is the target data is obtained (step S20).

The metadata recorded in the related art has been described above. When directly acquiring the target data without through the BiM decoder from the BiM data generated in the related art, the determination of the Element presence/absence identifier is performed from the head of the BiM data. It does not take much time to reach the target data if the target data is ahead of the BiM data. However, it takes great amount of time to reach the target data the more the target data is behind the BiM data.

Thus, in the present invention, alternative information for embedding alternative data when the data is not present is described for items not essential in the metadata, where coding is performed with the alternative data embedded if the alternative information is described so that acquisition of the target data from the coded data can be easily and efficiently carried out.

The metadata recorded by the recording device 100 according to one embodiment of the present invention will now be described.

FIG. 2A and FIG. 2B are explanatory diagrams describing the XML schema defined in the clip data editing unit of the recording device 100 according to one embodiment of the present invention, and the XML data generated in the clip data editing unit 108 based on the XML schema. The clip data editing unit 108 acquires picture data from the communication unit 122 and the removable media 126 inserted to the drive 124, and generates the XML data based on the picture data and the XML schema.

FIG. 2A shows one example of the XML schema defined in the clip data editing unit 108 of the recording device 100 according to one embodiment of the present invention, and the XML data generated based on the XML schema. The present embodiment has features in that the <element> tag is enclosed by the <choice> tag in the XML schema. The <choice> tag is a tag used to pick out one of a plurality of elements.

As shown in FIG. 2A, the <element> tag enclosed by the <choice> tag defines "A" and "ANil" as element names. The <element> tag defined with the element name "A" is an element for storing information on the item of "A" in the XML data. The <element> tag defined with the element name "ANil" is an element for storing as alternative data in the XML data when the item of "A" is not an essential item.

Non-essential item may be a non-standard item defined by the manufacturing company. The non-standard item includes information related to the setting and the control of a video camera manufactured by the relevant manufacturing company. The information related to the setting of the video camera includes information related to aperture and focal length of the video camera. Such information has different recording information depending on the type of video camera and is may not be recorded.

In the present embodiment, the element is defined with a name added with "Nil" at the end of the element name thus indicating that the relevant element is alternative data, but the letter or the letter string added to the end of the element name is not limited to this example.

If the item of "A" is not an essential item, <ANil/> tag indicating that the element name is "ANil" and that the content is empty is described in the XML data.

FIG. 2B shows one example of the XML schema defined in the clip data editing unit 108 of the recording device 100 according to one embodiment of the present invention. First, the order of appearance of the elements is defined with the <sequence> tag. A set of each element is defined by being enclosed with the <choice> tag in the region enclosed with the <sequence> tag.

The set of each element enclosed with the <choice> tag is the set of <element> tag in which the element name is defined and <element> tag in which the element name added with "Nil" at the end of the relevant element name is defined.

Each element enclosed by the <choice> tag is defined in the order of the <element> tag in which the element name is defined and the <element> tag in which the element name added with "Nil" at the end of the relevant element name is defined. Defining the <element> tag in the order of dictionary in the <choice> tag is convenient when coding the XML data described based on the XML schema. The details will be hereinafter described.

FIG. 3 is an explanatory diagram describing an example of the XML data described based on the XML schema defined in the clip data editing unit 108 of the recording device 100 according to one embodiment of the present invention, and the BiM data (data) obtained by compression coding the described XML data in the clip data editing unit 108.

The clip data editing unit 108 creates the XML data, which is one example of metadata, based on the picture or audio data input to the recording device 100, and the XML schema defined in the clip data editing unit 108. When creating the metadata, metadata (real time metadata) corresponding to each frame of the picture or the audio data, and data (non-real time metadata) in which real time property is not demanded in reproduction of the image signal are created.

In FIG. 3, a case where all elements from element "A" to element "Z" are described without being omitted in the XML data is shown. The value a enclosed by the tag <A> is described as the value of the element "A", and the value b enclosed by the tag <B> is described as the value of the element "B".

The BiM data obtained by compression coding the XML data described as above in the clip data editing unit 108 is described with repetition of one bit of choice identifier and a data part following the choice identifier. The choice identifier is represented with an ordinal starting from 0 of when the element names within the <choice> tag in the XML schema are lined in the order of dictionary. That is, the choice identifier is 0 if tag <A> is described in the XML data, and the choice identifier is 1 if tag <ANil> is described in the XML data.

The choice identifier is represented with an ordinal starting from 0 of when the element names within the <choice> tag are lined in the order of dictionary. For non-essential elements, the <element> tag is defined with the element name added with "Nil" at the end of the element name following the <element> tag defined with the element name. According to such definition, it becomes apparent in the BiM data that the data is present in the data part when the choice identifier is 0 and the data is not present in the data part when the choice identifier is 1.

When generating the BiM data by coding in the BiM encoder of the clip data editing unit 108, the coding is desirably carried out such that the sum of the choice identifier and the data part becomes integral multiples of one byte (8 bits). Through such coding, the choice identifier and the data part repeatedly appear in units of number of bytes of integral multiples of one byte, and thus the data can be more easily acquired. In the present embodiment, description will be made that coding is performed such that the sum of the choice identifier and the data part becomes one byte.

As described above, in the metadata recorded in the related art, the data part itself is not present in the BiM data for the element which the data is not present, whereby the data will be stuck and thus the offset of each data will not be fixed. In the metadata recorded in one embodiment of the present invention, alternative data is described for the element which data is not present, and thus the data part is present in the BiM data and the data will not be stuck. Therefore, the offset of each data is also fixed in the BiM data and acquisition of data can be easily and rapidly performed.

Figure 4:
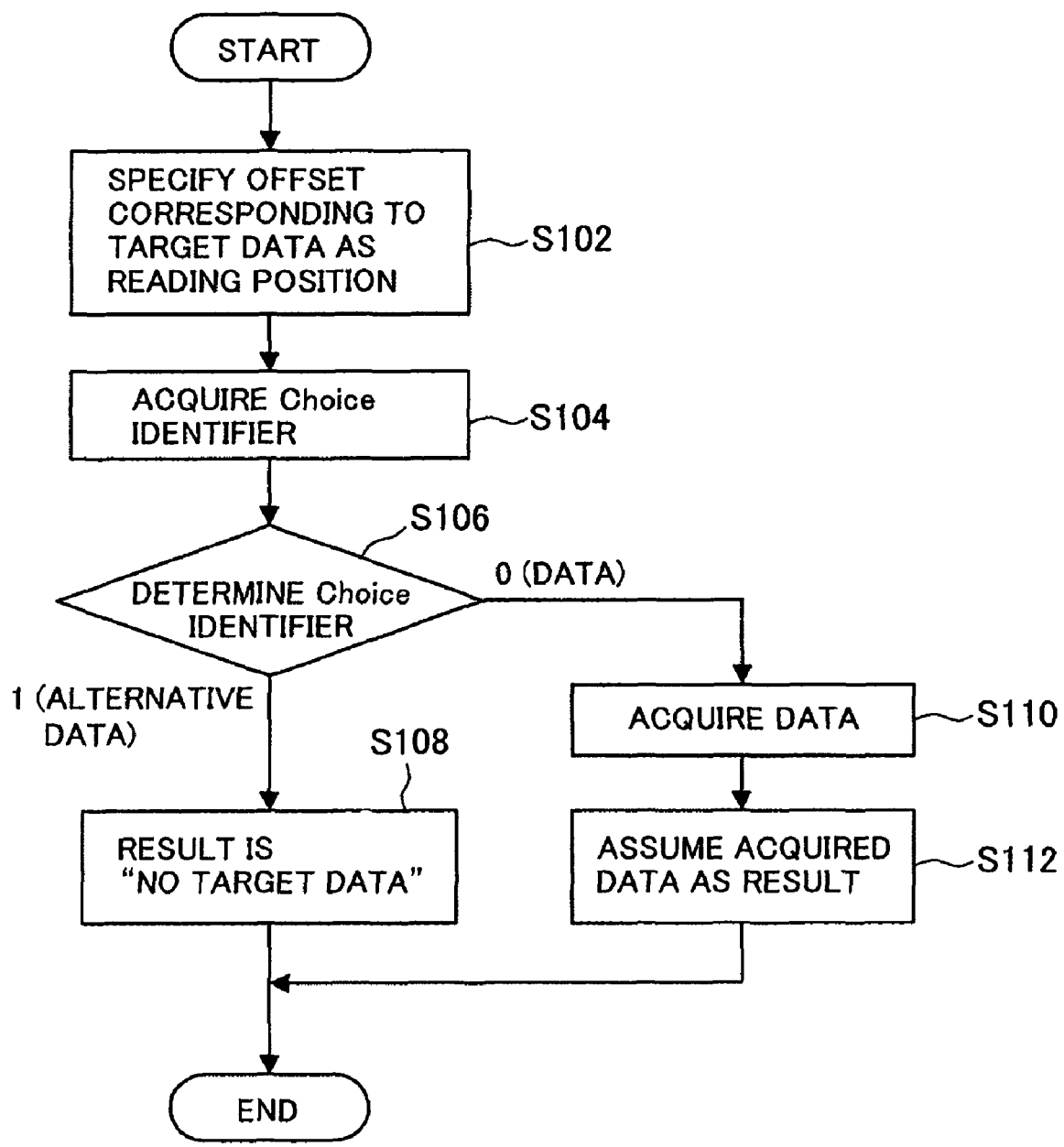
FIG. 4 is a flowchart for acquiring certain data from the BiM data generated in one embodiment of the present invention.

FIG. 4 is a flowchart of acquiring certain data from the BiM data generated in one embodiment of the present invention.

First, the offset corresponding to the target data is specified as the reading position (step S102). In other words, the offset corresponding to the first data is specified as the reading position when acquiring the first data, and the offset corresponding to the tenth data is specified as the reading position when acquiring the tenth data.

In the present embodiment, coding is performed such that the choice identifier and the data part become one byte. Therefore, the first byte from the head is specified as the reading position when acquiring the first data, and the tenth byte from the head is specified as the reading position when acquiring the tenth data.

After specifying the offset corresponding to the target data as the reading position in step S102, the choice identifier corresponding to the relevant data is acquired (step S104). After acquiring the choice identifier in step S104, determination on the acquired choice identifier is made (step S106).

If the choice identifier is 1 in the determination of step S106, the value does not exist in the data part of the relevant data (all stored with 0), and thus the result is no target data (step S108). If the choice identifier is 0, the data is present in the data part, and thus the data is acquired from the data part (step S110). The result is that the acquired data is the target data (step S112).

In the related art, the element presence/absence identifier is sequentially checked from the head of the data until reaching the desired data in order to acquire the desired data from the BiM data. In order to acquire the desired data from the BiM data according to the present embodiment, on the other hand, the offset corresponding to the target data is specified as the reading position, and the choice identifier corresponding to the relevant data is acquired to determine the presence/absence of the data, where the data can be acquired from the data part if the data is present.

Figure 5:
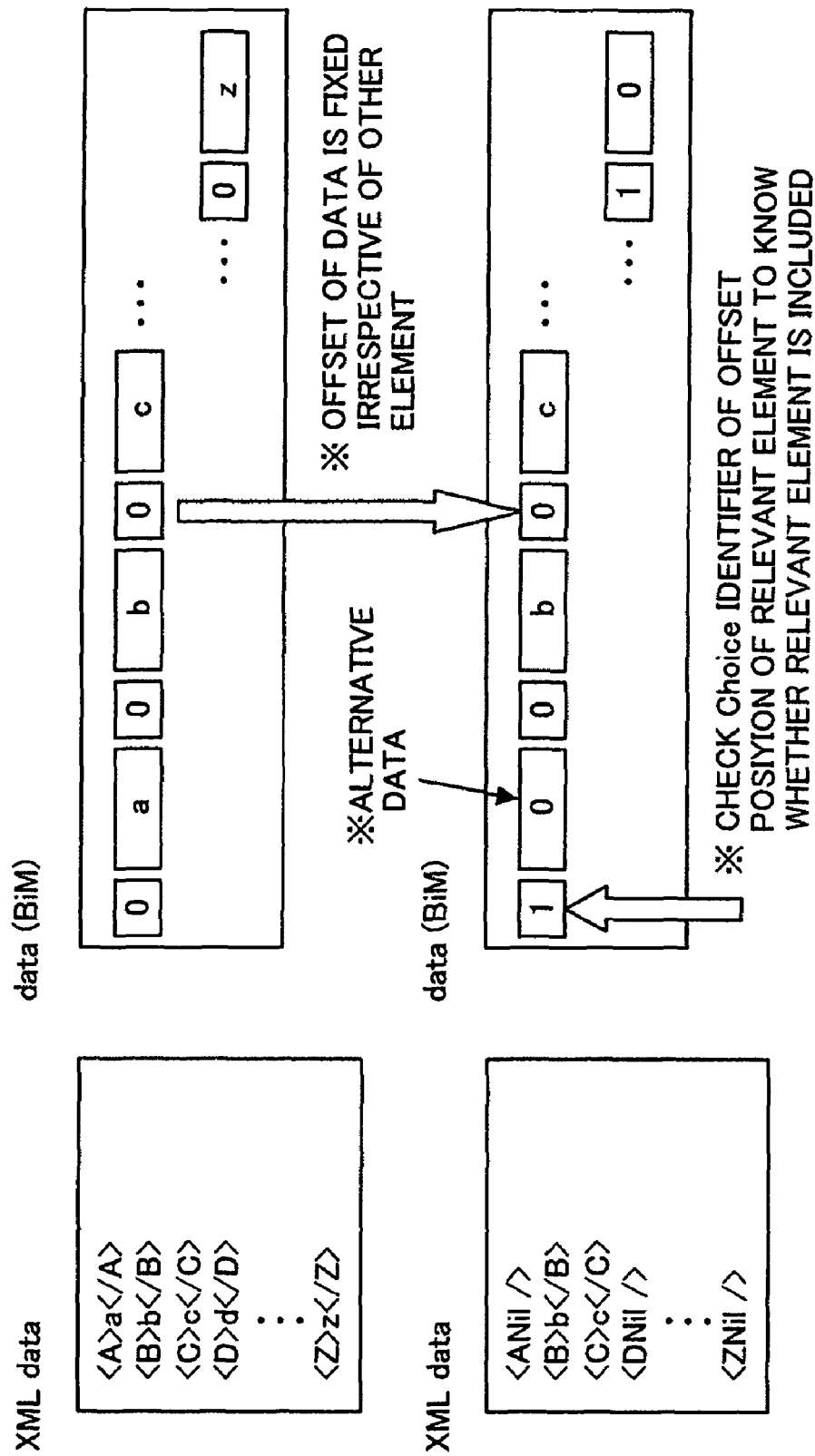
FIG. 5 is an explanatory diagram describing a case of acquiring certain data from the BiM data generated in one embodiment of the present invention.

FIG. 5 is an explanatory diagram describing a case of acquiring certain data from the BiM data generated in one embodiment of the present invention. The upper stage of FIG. 5 shows a case where all the data are described on the XML data without being omitted, and the lower stage of FIG. 5 shows a case where the data is described on the XML data with one part of the data omitted.

As shown on the upper stage of FIG. 5, when all the data are described without being omitted, the set of the choice identifier having a value of 0 and the data part stored with data following the choice identifier is repeated for all the elements in the BiM data.

As shown on the lower stage of FIG. 5, when data is described with one part of the data omitted, the set of the choice identifier having a value of 0 or 1 and the data part storing data or having a value of 0 following the choice identifier is repeated for all the elements in the BiM data. In the lower stage of FIG. 5, element "A" and element "D" are omitted, and the relevant element has <ANil/> tag and <DNil/> tag described on the XML data.

In either case, however, the offset of each data is fixed in the BiM data regardless of the presence/absence of data of other elements. Therefore, when acquiring the data of element "C" from the coded BiM data, the presence/absence of data of other elements is not taken into consideration. The data can be acquired by specifying the offset corresponding to the target element "C" as the reading position, acquiring the choice identifier of the offset position of the element "C", and determining the value of the choice identifier.

Normally, the value of the identifier is defined as 1 if the data is present, and the value of the identifier is defined as 0 if the data is not present. However, in the present embodiment, the value of the choice identifier is defined as 0 if the data is present, and the value of the choice identifier is defined as 1 if the data is not present.

According to such definition, the data is not present in the relevant byte if the bit at the head of the byte is 1, and the data is present in the relevant byte if the bit at the head of the byte is 0. Therefore, when acquiring the data from the relevant byte, a mask process of removing the choice identifier of the bit at the head is not performed, and the data can be directly acquired from the relevant byte, whereby direct acquisition of data from the BiM data is facilitated.

As described above, according to the present embodiment, a process of checking the identifier until reaching the target data from the head of the data as in the related art becomes unnecessary, and acquisition of data from the coded data can be easily and rapidly performed by creating metadata of coding such that the position of the data is fixed irrespective of the presence/absence of data of other elements. If the data can be directly acquired from the coded data, the processing time is reduced, and furthermore, the decoder (BiM parser) for decoding the BiM data is unnecessary since the BiM data is not decoded.

The structure of the data coded by the present embodiment also has a combination of an identifier and a data part similar to the structure of the coded data in the related art. Therefore, even when causing the device for acquiring the data on the basis of the structure of the coded data in the related art to acquire the data from the data coded by the present embodiment, the definition of the identifier is simply reversed, and thus the data can be directly acquired from the data coded by the present embodiment with minor corrections on the device in the related art.

The series of processes described above can be executed by hardware or can be executed by software. When executing by software, the CPU 102 reads out the program stored in the ROM 104, and executes the above-described process according to the read out program.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device for generating and coding metadata in a number of data units in discrete data parts of a data structure, the recording device comprising;
    a metadata describing, unit for describing the metadata as essential items of metadata and non-essential items of metadata, and for embedding in a discrete data part alternative information for a non-essential item if data for that non-essential item is not present;
    a coding unit for coding the non-essential items of metadata containing the embedded alternative information in a binary format in the same number of data units as would have been occupied by said non-essential item if data for that non-essential item would have been present and for coding the essential items of metadata in a binary format in one or more data units, and generating coded data for both the non-essential items of metadata of said one or more data units and the essential items of metadata of said one or more data units such that coded data for alternative information is present in said one or more data units in a discrete data part when data for the non-essential item for that discrete data part is not present; and,
    an output unit for outputting the coded data.

2. The recording device according to claim 1, wherein the metadata describing unit describes the alternative information with an element name having a predetermined letter string added to the element name of the non-essential item in the metadata.

3. The recording device according to claim 1, wherein the coding unit adds "1" before the alternative data and adds "0" before data other than the alternative data.

4. A recording method for generating and coding metadata in a number of units in discrete data parts of a data structure, the recording method performed by a processor and comprising the steps of:
    describing the metadata as essential items of metadata and non-essential items of metadata, and for embedding in a discrete data part alternative information for a non-essential item if data for that non-essential item is not present;
    coding the non-essential items of metadata containing the embedded alternative information in a binary format in the same number of data units as would have been occupied by said non-essential item if data for that non-essential item would have been present and for coding the essential items of metadata in a binary format in one or more data units, and generating coded data for both the non-essential items of metadata of said one more data units and the essential items of metadata of said one or more data units such that coded data for alternative information is present in said one or more data units in a discrete data part when data for the non-essential item for that discrete data part is not present; and
    outputting the coded data.

5. A non-transitory computer-readable record medium encoded with a computer program that, when executed, generates and codes metadata in a number of data units in discrete data parts of a data structure by performing the steps comprising:
    describing the metadata as essential items of metadata and non-essential items of metadata, and for embedding in a discrete data part alternative information for a non-essential item if data for that non-essential item is not present; and
    coding the non-essential items of metadata containing the embedded alternative information in a binary format in the same number of data units as would have been occupied by said non-essential item if data for that non-essential item would have been present and for coding the essential items of metadata in a binary format in one or more data units, and generating coded data for both the non-essential items of metadata of said one or more data units and the essential items of metadata of said one or more data units such that coded data for alternative information is present in said one or more data units in a discrete data part when data for the non-essential item for that discrete data part is not present.

* * * * *